United States Patent
Babin

(10) Patent No.: US 6,893,249 B2
(45) Date of Patent: May 17, 2005

(54) VALVE PIN ACTUATING MECHANISM

(75) Inventor: Denis Babin, Georgetown (CA)

(73) Assignee: Mold-Masters Limited, Georgetown (CA)

( * ) Notice: Subject to any disclaimer, the term of this patent is extended or adjusted under 35 U.S.C. 154(b) by 249 days.

(21) Appl. No.: 10/237,035

(22) Filed: Sep. 9, 2002

(65) Prior Publication Data

US 2003/0057607 A1 Mar. 27, 2003

Related U.S. Application Data

(60) Provisional application No. 60/336,184, filed on Dec. 6, 2001.

(30) Foreign Application Priority Data

Sep. 7, 2001 (JP) ............................................. 2357083

(51) Int. Cl.⁷ .............................................. B29C 45/23
(52) U.S. Cl. ....................................... 425/564; 425/572
(58) Field of Search ................................ 425/564, 572

(56) References Cited

U.S. PATENT DOCUMENTS

| | | |
|---|---|---|
| 3,488,810 A | 1/1970 | Gellert |
| 3,806,295 A | 4/1974 | Gellert |
| 3,912,133 A | 10/1975 | Hehl |
| 3,915,358 A | 10/1975 | Hehl |
| 4,013,393 A | 3/1977 | Gellert |
| 4,026,518 A | 5/1977 | Gellert |
| 4,053,271 A | 10/1977 | Gellert |
| 4,222,733 A | 9/1980 | Gellert et al. |
| 4,272,236 A | 6/1981 | Rees et al. |
| 4,286,941 A | 9/1981 | Gellert et al. |
| 4,712,995 A | 12/1987 | Basnett |
| 4,793,795 A | 12/1988 | Schmidt et al. |
| 4,810,184 A | 3/1989 | Gellert et al. |
| 4,917,593 A | 4/1990 | Gellert |
| 4,917,594 A | 4/1990 | Gellert et al. |
| 4,919,606 A * | 4/1990 | Gellert ........................ 425/549 |
| 5,067,893 A | 11/1991 | Osuna-Diaz |
| 5,223,275 A * | 6/1993 | Gellert ........................ 425/564 |
| 5,387,099 A | 2/1995 | Gellert |
| 5,902,614 A | 5/1999 | Kuntz |
| 5,916,605 A | 6/1999 | Swenson et al. |
| 5,942,257 A | 8/1999 | Gellert et al. |
| 5,948,450 A | 9/1999 | Swenson et al. |
| 5,984,661 A | 11/1999 | Vorköper |
| 6,086,357 A | 7/2000 | Steil et al. |

FOREIGN PATENT DOCUMENTS

| | | |
|---|---|---|
| DE | 32 37 924 A1 | 4/1984 |
| DE | 32 37 923 C2 | 8/1986 |
| EP | 0 282 999 A2 | 9/1988 |
| EP | 0 836 925 A1 | 4/1998 |
| EP | 0 832 729 B1 | 3/2000 |
| EP | 1 291 148 A1 | 3/2003 |
| GB | 1306697 | 2/1973 |
| WO | WO 96/27489 | 9/1996 |

OTHER PUBLICATIONS

Heat–Lock Needle–Valve Sprue Bushing Type A, Heatlock Catalog 2000.

* cited by examiner

*Primary Examiner*—Tim Heitbrink
(74) *Attorney, Agent, or Firm*—Sterne, Kessler, Goldstein and Fox P.L.L.C.

(57) ABSTRACT

A valve pin actuating mechanism including a valve pin guiding element for connection to a valve pin, a linkage element and an actuator. The valve pin guiding element has a sliding surface for sliding within a channel, and first and second engagement surfaces. The linkage element has first and second arms, which have opposing, inwardly facing arcuate engagement surfaces for engaging the valve pin guiding element. The linkage element is moved by the actuator.

14 Claims, 10 Drawing Sheets

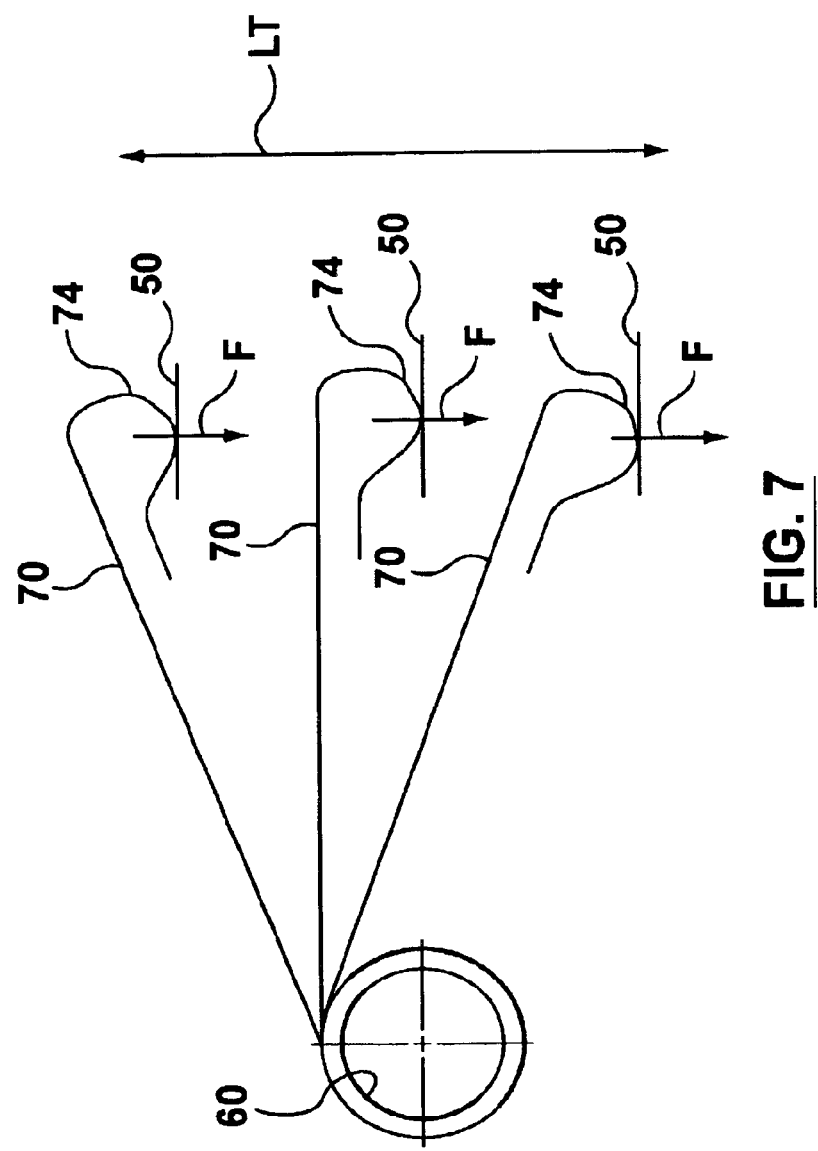

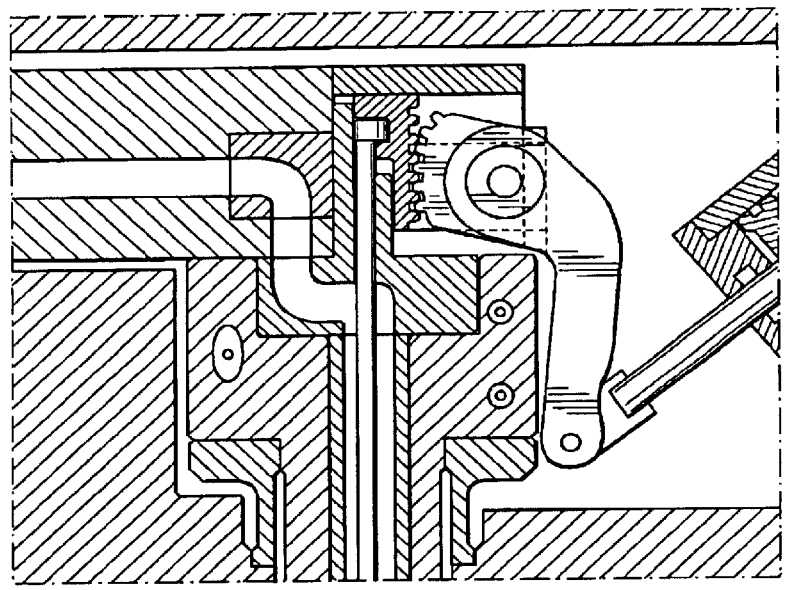
FIG. 11 (PRIOR ART)
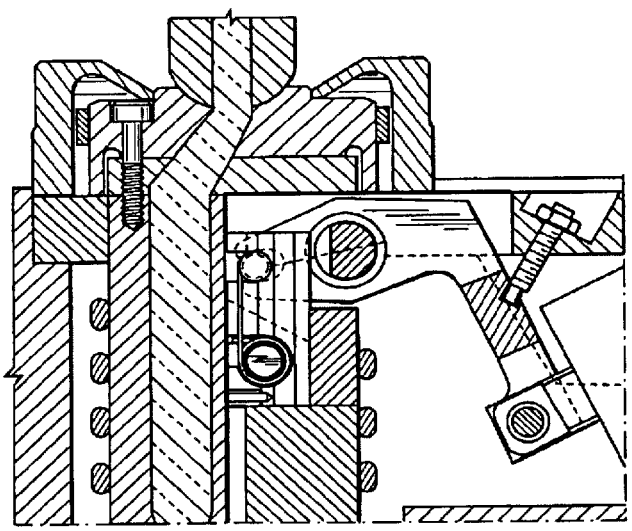 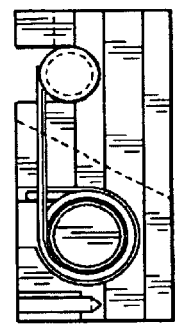
FIG. 12A (PRIOR ART)   FIG. 12B (PRIOR ART)

VALVE PIN ACTUATING MECHANISM

FIELD OF THE INVENTION

This invention relates to an injection molding machine, and more particularly to a valve pin actuating mechanism for an injection molding machine.

BACKGROUND OF THE INVENTION

Commonly, melt flow in an injection molding machine is controlled by a valve pin, which is moved in a melt passage by an actuating mechanism. Depending on the layout constraints of the melt passages and other components in an injection molding machine, it can be desirable to provide an actuating mechanism for a valve pin in a melt channel, that extends laterally to the valve pin.

The technical literature shows several hot runner injection nozzle designs having a valve pin actuating mechanism incorporating a lateral arm, or linkage, that directly engages a valve pin to push the valve pin towards a mold gate to stop the transfer of molten material from the nozzle into the mold cavity. Reference is made in this regard to U.S. Pat. No. 3,806,295, U.S. Pat. No. 4,026,518, U.S. Pat. No. 4,222,733 and U.S. Pat. No. 4,272,236. In these patents, however, the lateral arm does not engage the valve pin in order to move it back to an 'open' position. Rather, the movement of the valve pin away from the mold gate is achieved by the back pressure generated by the pressurized melt in the nozzle. In these designs the valve pin is not attached to any guiding sleeve movable inside the nozzle. A typical example of this lateral valve gating approach is shown in FIG. 9, which shows a mechanism disclosed in U.S. Pat. No. 4,272,236.

The technical literature further shows hot runner injection nozzles where the valve pin is engaged laterally by an arm, or linkage. This design makes possible to actuate the valve pin inside the nozzle in both directions relative to the mold gate. Reference is made in this regard to U.S. Pat. No. 3,488,810, U.S. Pat. No. 4,712,995 and U.S. Pat. No. 4,793,795 where the lateral arm, or linkage has circular movement with respect to the valve pin. In these designs the valve pin is engaged directly by the linkage, and is not attached to a guiding sleeve movable inside the nozzle. A typical example of this lateral valve gating approach is shown in FIG. 10, which shows a mechanism disclosed in U.S. Pat. No. 4,712,995.

The technical literature further shows hot runner injection nozzles where the valve pin is engaged laterally by an arm, or linkage. Reference is made in this regard to U.S. Pat. No. 4,919,606, U.S. Pat. No. 5,902,614, U.S. Pat. No. 5,948,450 and U.S. Pat. No. 5,984,661. In these designs, the valve pin is attached to a guiding sleeve movable inside the nozzle, and the lateral arm, or linkage, has a circular movement with respect to the valve pin. Typical examples of this lateral valve gating approach are shown in FIGS. 11, 12a and 12b, which show mechanisms disclosed in U.S. Pat. No. 4,919,606 and U.S. Pat. No. 5,948,450 respectively. In the more recent U.S. Pat. No. 5,948,450, the lateral arm does not directly engage the guiding sleeve, (also referred to as a sled). As shown in FIGS. 12a and 12b, the actuating mechanism of the '450 patent includes a lateral arm that engages a pin, which is, in turn, connected to the sled. Furthermore, the pin is retained in place by an additional spring. The mechanism disclosed in the '450 patent includes many parts, which inherently increases its complexity and cost of production and which can reduce its reliability. It is known that, due to the high temperature of operation, which can be, for example, in the range of 250° C., and due to the huge frequency of injection cycles, which can be, for example, in the range of 400 movements/minute, it is desirable to have a minimum number of parts involved in the actuation of the valve pin.

There is a continuing need for a laterally actuated valve gating mechanism that is reliable in operation, that provides reduced stresses on the valve pin and is made of a reduced number of components.

SUMMARY OF THE INVENTION

In a first aspect, the invention is directed to a valve pin actuating mechanism for use with a valve pin, the valve pin being moveable in a portion of a melt passage of an injection molding machine, the melt passage having an inlet for receiving melt from a melt source. The valve pin actuating mechanism includes a valve pin guiding element, a linkage element and an actuator: The valve pin guiding element is for connection to the valve pin and for guiding the valve pin along a line of travel. The valve pin guiding element has first and second receiving surfaces, wherein at least one of the receiving surfaces is substantially perpendicular to the line of travel. The linkage element has first and second arms having inwardly facing, opposed engagement surfaces for engaging the first and second receiving surfaces on said valve pin guiding element. The actuator is for moving the linkage element.

In a preferred embodiment, at least one of the engagement surfaces on the first and second arms is arcuate.

In a second aspect, the invention is directed to a valve pin actuating mechanism for use with a valve pin, the valve pin being moveable in a portion of a melt passage of an injection molding machine, the melt passage having an inlet for receiving melt from a melt source. The valve pin actuating mechanism includes a valve pin guiding element, a linkage element and an actuator. The valve pin guiding element is for connection to the valve pin and for guiding movement of the valve pin in the melt passage. The linkage element has first and second arms having inwardly facing, opposed engagement surfaces for engaging the valve pin guiding element. At least one of the engagement surfaces is arcuate. The actuator is for moving said linkage element.

In a third aspect, the invention is directed to a valve pin actuating mechanism for use with a valve pin, the valve pin being moveable in a portion of a melt passage of an injection molding machine, the melt passage having an inlet for receiving melt from a melt source. The valve pin actuating mechanism includes a valve pin guiding element, a linkage element and an actuator. The valve pin guiding element is for supporting the valve pin and for movement of the valve pin and guiding element together in a guide channel. The valve pin guiding element has first and second outer receiving surfaces. The linkage element has first and second arms for engaging the outer receiving surfaces on the valve pin guiding element. The actuator is for moving the linkage element.

In a fourth aspect, the invention is directed to a hot runner nozzle system for an injection molding machine. The hot runner nozzle system includes an injection nozzle, a valve pin and a valve pin actuating mechanism. The injection nozzle has a nozzle body defining a nozzle melt passage. The nozzle melt passage has an inlet for receiving melt from a melt source. The injection nozzle includes a heater for heating melt in the nozzle melt passage. The valve pin is moveable in the nozzle melt passage, so that the valve pin cooperates with the nozzle melt passage for controlling melt flow through the nozzle melt passage. The valve pin actuating mechanism is any of the valve pin actuating mechanisms described above.

In a fifth aspect, the invention is directed to an injection molding machine. The injection molding machine includes a manifold, an injection nozzle, a valve pin and a valve pin actuating mechanism. The manifold has a manifold melt passage having a n inlet for receiving melt from a melt source. The injection nozzle has a nozzle body defining a nozzle melt passage. The nozzle melt passage is downstream from the manifold melt passage. The injection nozzle includes a heater for heating melt in the nozzle melt passage. The valve pin is moveable in the nozzle melt passage, so that the valve pin cooperates with the nozzle melt passage for controlling melt flow through said nozzle melt passage, The valve pin actuating mechanism is any of the valve pin actuating mechanisms described above.

In a sixth aspect, the invention is directed to a method of moving a valve pin between first and second positions in an injection molding machine. The method includes:

supporting the valve pin in a valve pin guiding element for movement of the valve pin and guiding element together, the guiding element having first and second outer, planar receiving surfaces;

supporting and guiding the valve pin guiding element in a channel, the channel being adapted for movement of the valve pin guiding element along a line of travel; and applying forces to the receiving surfaces of the guiding element to effect movement of the valve pin between the first and second positions.

BRIEF DESCRIPTION OF THE DRAWINGS

For a better understanding of the present invention and to show more clearly how it may be carried into effect, reference will now be made by way of example to the accompanying drawings, in which:

FIG. 7 is a view of the travel path of a portion of the linkage element and a portion of the guiding element of FIG. 1;

FIG. 11 is an elevation view of a portion of a third injection molding machine having a valve pin actuating mechanism of the prior art; and FIGS. 12a and 12b are elevation views of a portion of a fourth injection molding machine having a valve pin actuating mechanism of the prior art.

DETAILED DESCRIPTION OF THE INVENTION

Figure 1:
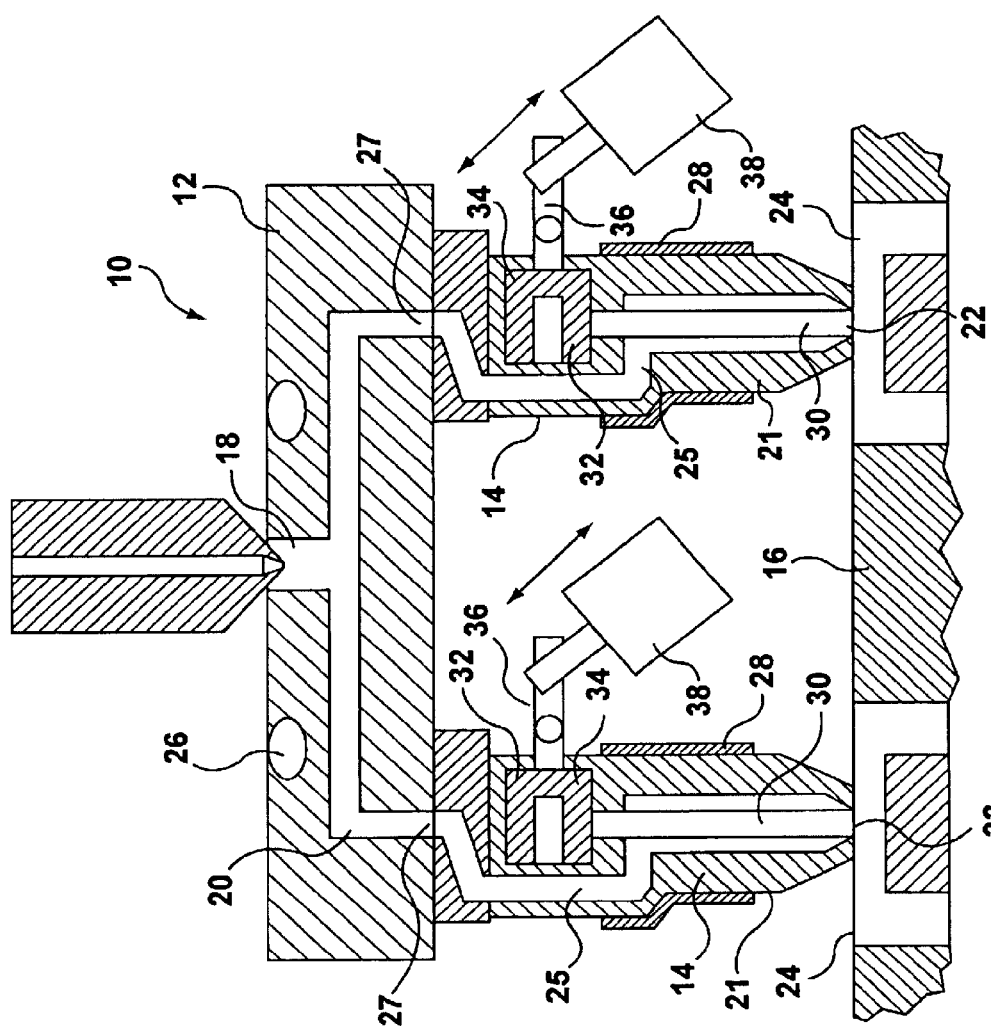
FIG. 1 is a sectional elevation view of an injection molding machine having a plurality of valve pin actuating mechanisms in accordance with an embodiment of the present invention.

Reference is made to FIG. 1, which shows an injection molding machine in accordance with the present invention, shown generally at 10. Injection molding machine 10 can be used for the production of molded articles. As an example embodiment, injection molding machine 10 may have a manifold 12, a plurality of nozzles 14, a mold cavity plate 16, a plurality of valve pins 30 and a plurality of valve pin actuating mechanisms 32. Manifold 12 has a mold machine inlet 18, which leads to a plurality of manifold melt passages 20. A heater 26 is included in manifold 12 to heat melt in manifold melt passages 20. Each nozzle 14 includes a nozzle body 21 and a heater 28. Nozzle body 21 defines a nozzle melt passage 25, which has an inlet 27 that is downstream from one of the melt passages 20. Heater 28 is used to heat the flow of melt through nozzle 14. The mold cavity plate 16 defines a plurality of mold cavities 24 that are downstream from the nozzle melt passages 25. The junction between a nozzle melt passage 25 and a mold cavity 24 is referred to as a gate 22. It will be appreciated that the melt passage configuration shown in the Figures is exemplary and that other melt passage configurations are permissible within the scope of the invention.

Valve pins 30 extend into a portion of the nozzle melt passages 25 and are moveable therein along a line of travel parallel to that portion of the nozzle melt passages 25, by valve pin actuating mechanisms 32, to control the flow of melt into the mold cavities 24. The valve pins 30 may be generally pin shaped, as shown, or alternatively they may have any suitable shape for controlling the flow of melt in nozzle melt passages 25.

Figure 2:
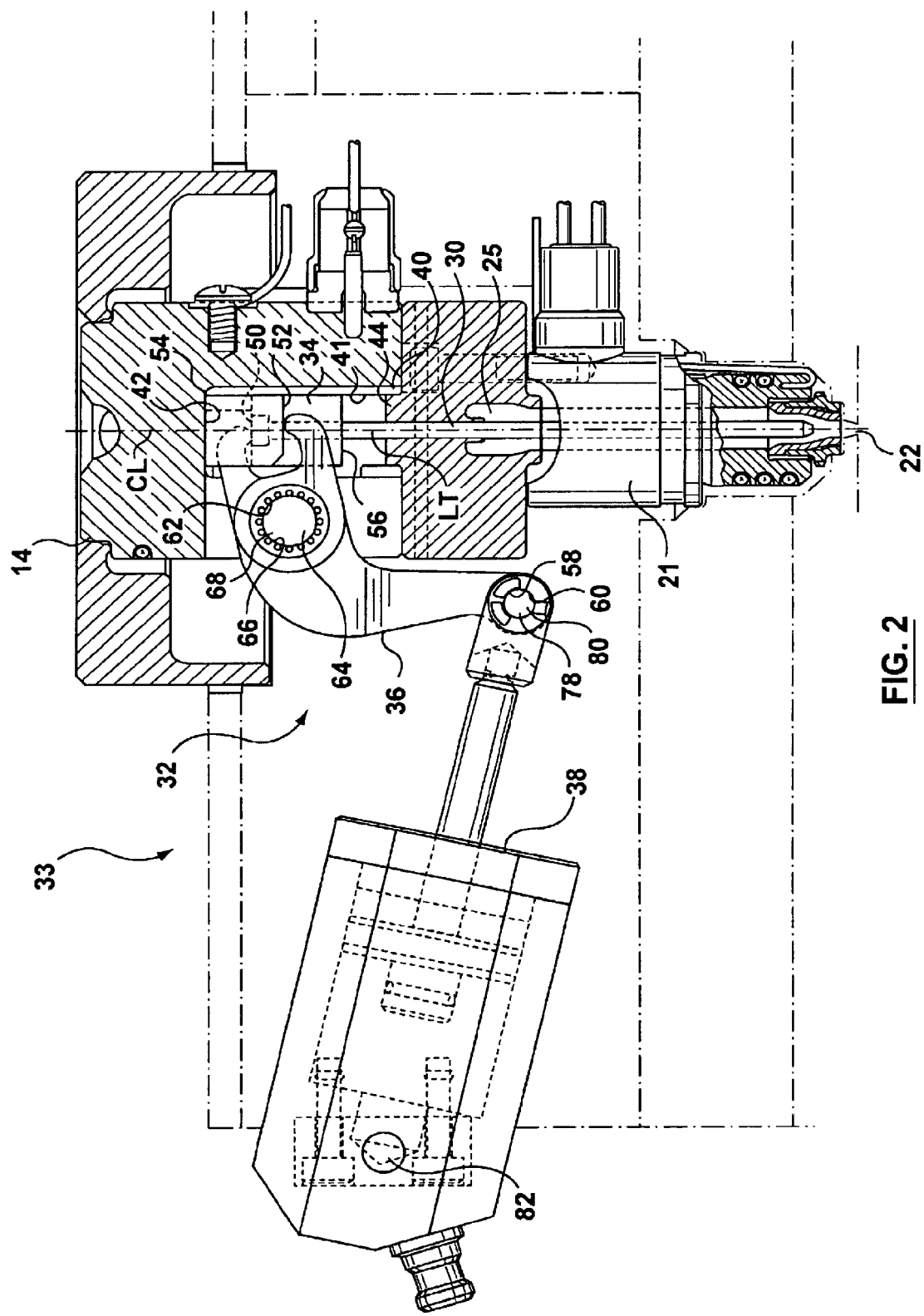
FIG. 2 is an elevation view of a portion of the injection molding machine of FIG. 1, showing the valve pin actuating mechanism and a valve pin in an 'open' position.

Reference is made to FIG. 2, which shows a nozzle system 33, each of which includes one of the nozzles 14, one of the valve pin 30 and one of the valve pin actuating mechanisms 32. The actuating mechanism 32 includes a valve pin guiding element 34, a linkage element 36 and a actuator 38. The valve pin actuating mechanism 32 can be used to access the valve pin laterally, and move the valve pin 30 through a range of positions, or between any suitable first and second positions. For example, for the embodiment as shown, where the valve pin is positioned near the gate 22, the valve pin actuating mechanism can be used to move the valve pin between an 'open' (first) position (as shown in FIG. 2), wherein melt flow is permitted to enter the mold cavity 24, and a 'close' (second) position, wherein the melt flow is prevented from entering the mold cavity 24 (see FIG. 3). Alternatively, the actuating mechanism 32 can be used to move the valve pin to a second position to permit less flow through a nozzle melt passage 25, than in the first position. Alternatively, the actuating mechanism can be used to move valve pins between first and second positions in other portions of an injection molding machine, such as, for example, in sprue mechanisms between manifold plates in a stack-mold.

The valve pin guiding element 34 supports and guides the valve pin 30. A sleeve 40 defines a channel 41. The valve pin guiding element 34 slides in channel 41 along a line of travel LT so that valve pin 30 moves in nozzle melt passage 25 between the first and second positions. Sleeve 40 has an aperture therethrough permitting the linkage element 36 to connect to guiding element 34.

A first limit surface 42 is positioned to limit the travel of the guiding element 34 at one end of channel 41. Similarly, a second limit surface 44 is positioned to limit the travel of the guiding element 34 at the other end of channel 41.

Reference is now made to FIGS. 4, 5, 6a and 6b. Guiding element 34 has a sliding surface 46 for sliding within channel 41. Sliding surface 46 is preferably generally cylindrical, as shown. Alternatively, however, sliding surface 46 may be square-shaped, rectangle-shaped, or may have any other shape suitable for permitting sliding.

Guiding element 34 has a receiving bore 48, which is shouldered, for receiving and capturing valve pin 30. Any suitable holding and guiding means for valve pin 30 can alternatively be used, however. For example, guiding element 34 can be integrally joined to valve pin 30. Guiding element 34 includes a first, outer, receiving surface 50, and two second, outer, receiving surfaces 52. The first and second receiving surfaces 50 and 52, receive the linkage element 36. The first and second receiving surfaces 50 and 52 are preferably planar, and perpendicular (see FIGS. 2 and 3) to the line of travel LT of the guiding element 34 in the channel 41. Alternatively, one of receiving surfaces 50 and 52, (ie. either receiving surface 50 or both of receiving surfaces 52), is planar and substantially perpendicular to the line of travel LT of the guiding element 34 in the channel 41, and the other of the surfaces is at least angled suitably for engagement by the linkage element 36 and movement of the guiding element 34 in the line of travel LT.

The valve pin guiding element 34 has first and second shoulders 54 and 56. Shoulders 54 and 56 cooperate with the first and second limit surfaces 42 and 44 to limit the travel of the guiding element 34, and the valve pin 30.

The linkage element 36 connects the actuator 38 to the valve pin guiding element 34. The linkage element 36 includes a first connector 58, which rotatably connects linkage element 36 to actuator 38. The first connector 58 may be, for example, a bore 60. Alternatively, connector 58 may be any suitable connection means for providing a rotatable connection between linkage element 36 and actuator 38.

Figure 3:
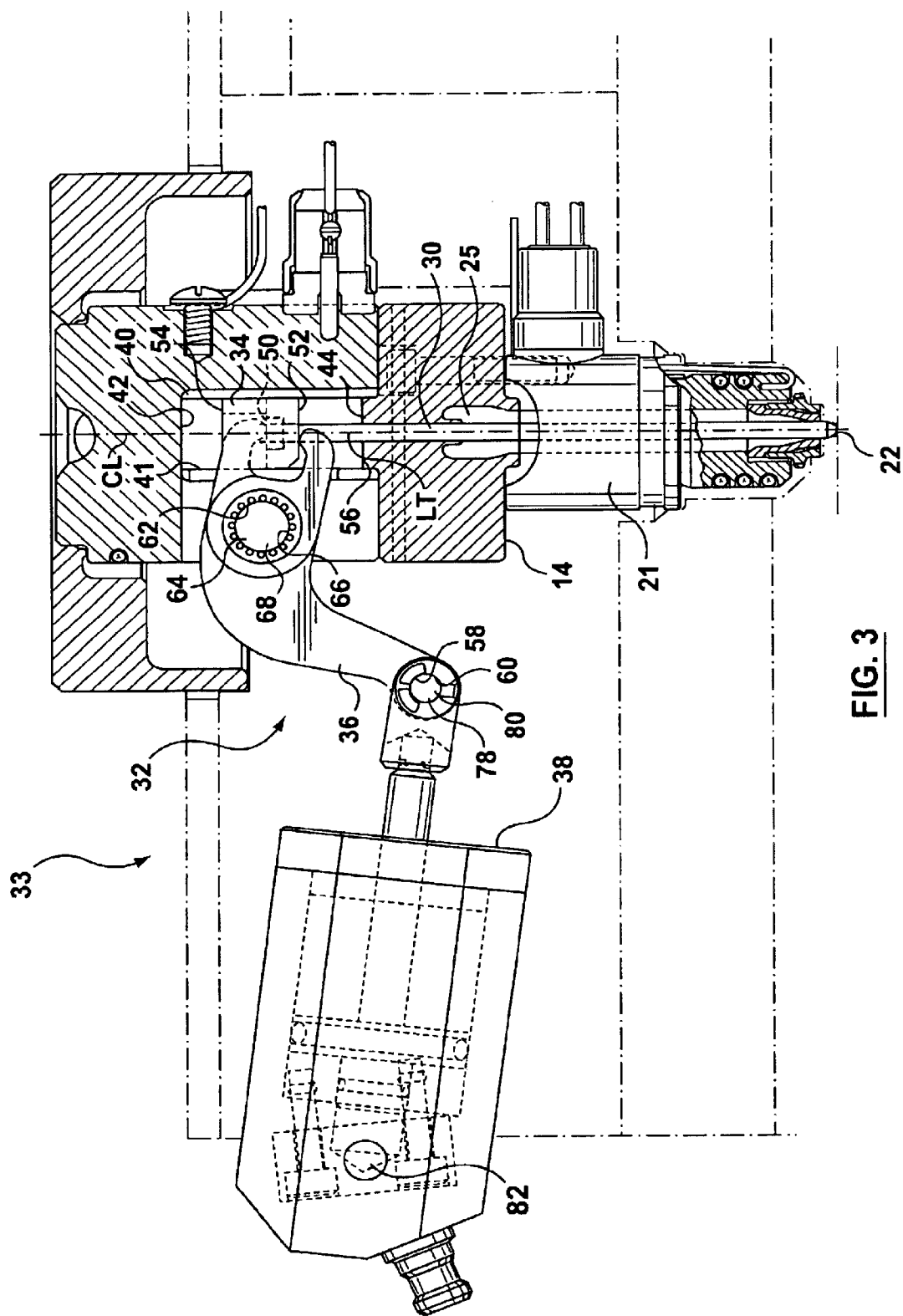
FIG. 3 is an elevation view of a portion of the injection molding machine of FIG. 1, showing the valve pin actuating mechanism and a valve pin in a 'close' position.
Figure 5:
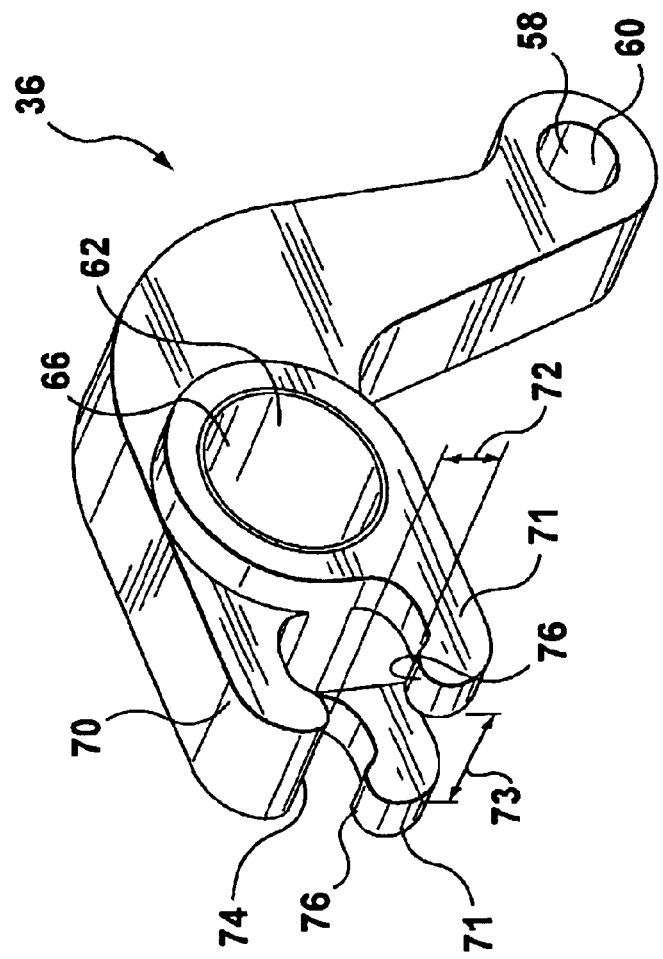
FIG. 5 is a perspective view of the linkage element of the valve pin actuating mechanism of FIG. 1.
Figure 4:
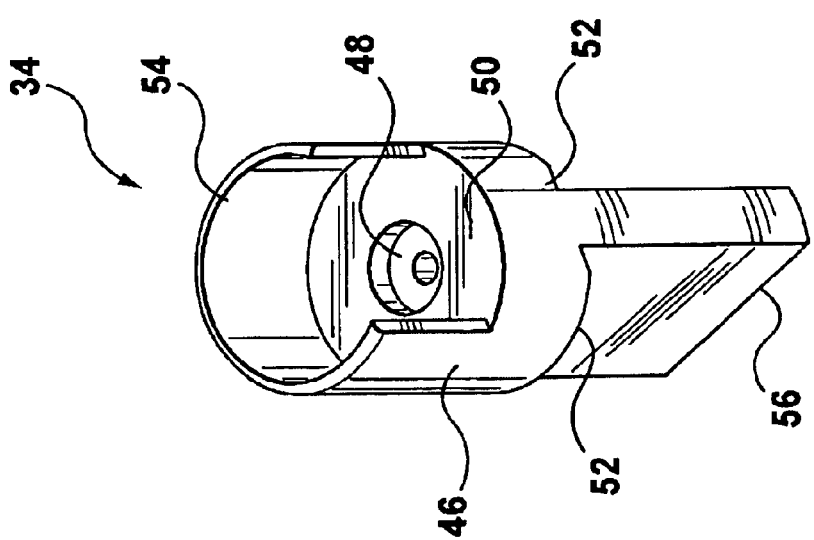
FIG. 4 is a perspective view of the valve pin guiding element of FIG. 1.
Figure 6A:
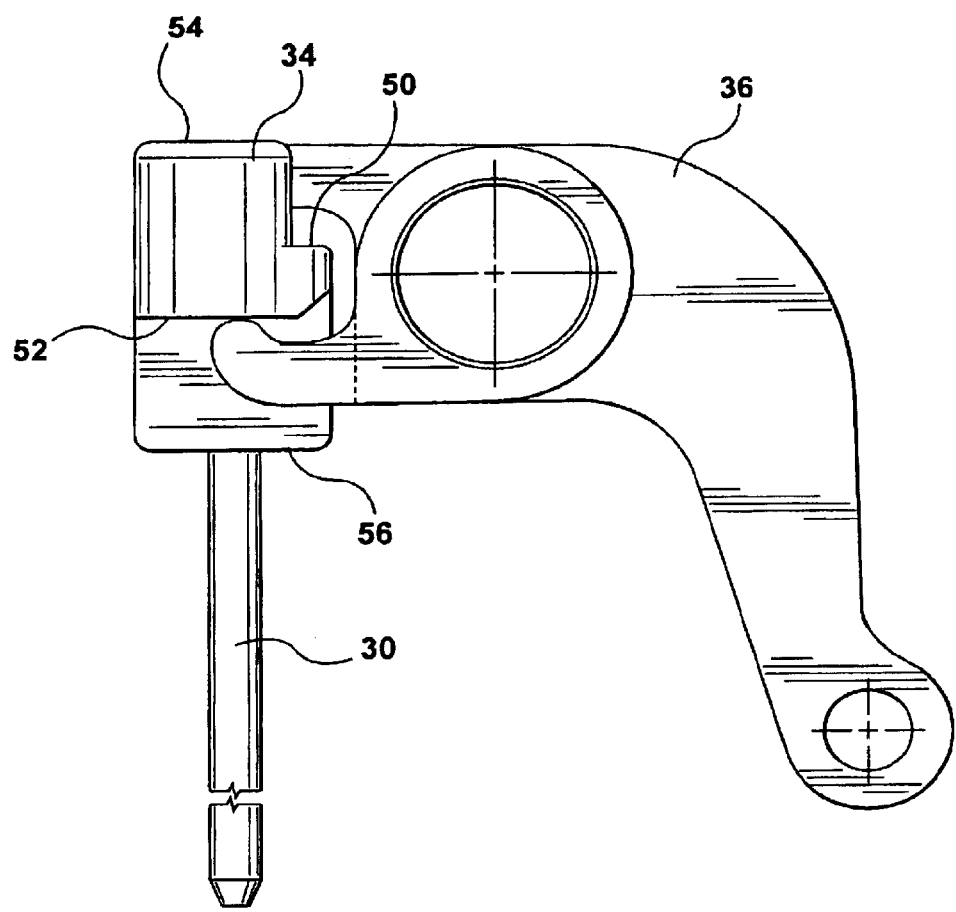
FIGS. 6a and 6b are views of the linkage element engaging the guiding element of FIG. 1.
Figure 6B:
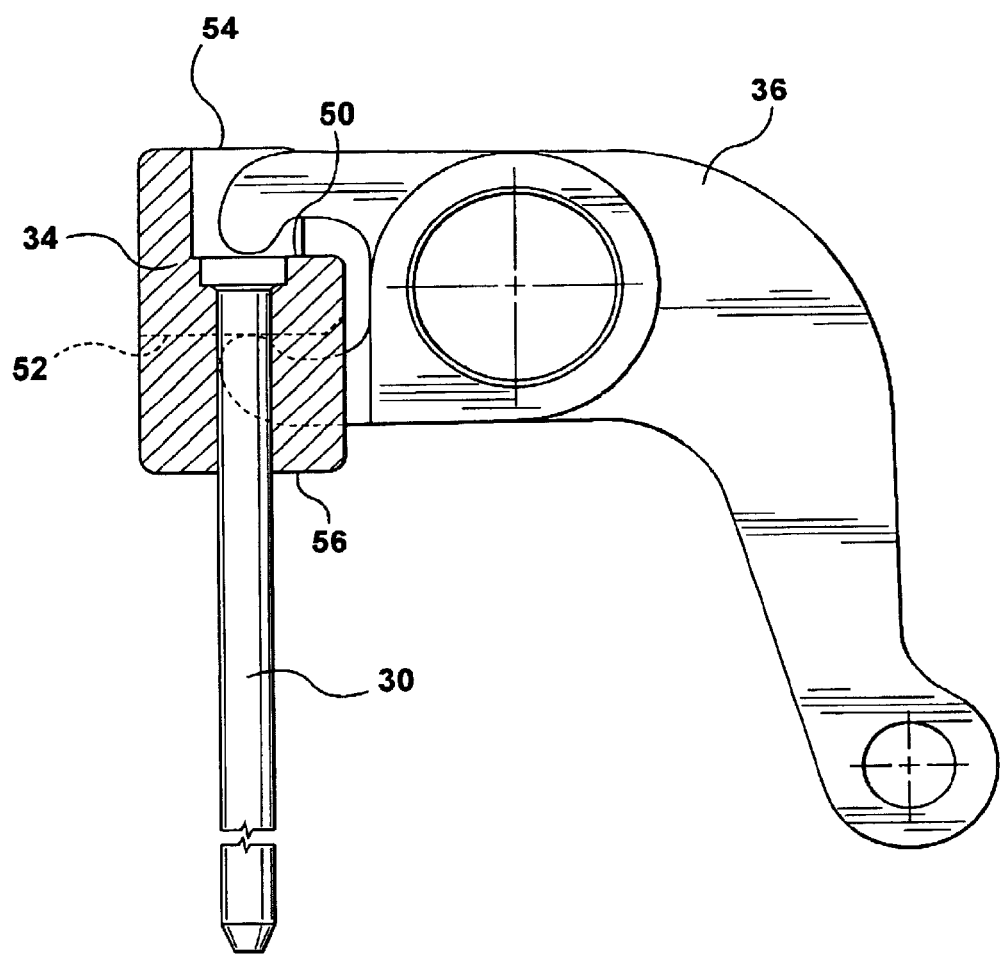

The linkage element 36 includes a second connector 62, which pivotally connects linkage element 36 to a portion 64 on the molding machine 10 (see FIGS. 2 and 3). The second connector 62 and portion 64 may be any suitable pivotal connection means, such as, for example, a bore 66, and a shaft 68 respectively.

The linkage element 36 has a first arm 70 and may have, for example, two second arms 71 for engaging the valve pin guiding element 34. The first and second arms 70 and 71 define a gap 72 therebetween. The second arms 71 define a second gap 73 permitting valve pin 30 and the shoulder portion 56 to extend therethrough. The first arm 70 and the second arms 71 have opposing, inwardly facing engagement surfaces 74 and 76 respectively. Engagement surface 74 engages receiving surface 50 for movement of the valve pin 30, in one direction (in this case—towards the 'close' position). Engagement surfaces 76 engage the second receiving surfaces 52 for movement of the valve pin 30 in the direction towards the 'open' position. Preferably, as shown, engagement surfaces 74 and 76 are arcuate, so that an actuation force for actuating the guiding element 34 and the valve pin 30, is not exerted through an edge, throughout the range of motion of the valve pin 30 and guiding element 34. Alternatively, one of the engagement surfaces 74 and 76 (ie. either surface 74, or both surfaces 76) is arcuate. Alternatively, however, engagement surfaces 74 and 76 may have any suitable shape for engaging surfaces 50 and 52 for moving guiding element 34. Gap 72 permits arm 70 to engage guiding element 34 at or near a selected location, such as, for example, at or near the centerline CL of the guiding element 34. Similarly, gaps 72 and 73 together permit second arms 71 to engage the guiding element 34 at or near a selected point.

Reference is made to FIG. 2. The actuator 38 may be any type of actuator, such as a pneumatic or hydraulic cylinder, or alternatively an electrical actuator. As shown, the actuator may be, for example, a linear, hydraulic actuator. Actuator 38 includes a connector 78 for rotatably connecting actuator 38 to linkage element 36. Connector 78 may be any suitable type of connector, such as, for example, a pin 80, which is received in bore 60. Actuator 38 is mounted to the injection molding machine 10 by a connector 82 which permits rotation thereabout. Connector 82 may be any suitable type of connector, such as for example a pin and bearing or bore arrangement.

During the cavity-filling portion of an injection cycle, the valve pin is in the 'open' position. Melt flows from a melt source (not shown) through the inlet 18, through melt passages 20 and 25, through gates 22 and into the mold cavities 24. Once this is completed, the melt flow to the cavities 24 is shut off. To shut off the melt flow to the gates 22, the actuator 38 is retracted, causing the rotation of the linkage element 36. The first engagement surface 74 engages the first receiving surface 50, moving the valve pin guiding element 34 and valve pin 30 towards the 'close' position. As shown in FIG. 3, the movement of the valve pin 30 is stopped when the shoulder 56 on the valve pin guiding element 34 contacts the limit surface 44.

Reference is made to FIG. 7, which shows the path followed by the arm 70 during the travel of the valve pin between the 'open' and 'close' positions. The direction of a force, (excluding frictional forces), transmitted between the first engagement surface 74 and the receiving surface 50, is shown by the line F. Regardless of the shape of the engagement surface 74, the line of force F remains perpendicular to the receiving surface 50, throughout the range of motion of the guiding element 34, ignoring friction. If the receiving surface 50 is perpendicular to the line of travel LT of the valve pin guiding element 34 and the valve pin 30, as shown in FIGS. 2 and 3, the line of force F is parallel to the line of travel LT of the valve pin guiding element 34 and the valve pin 30, throughout the range of travel of the guiding element 34 and the valve pin 30. Thus, lateral forces on the guiding element 34 are reduced.

Lateral forces, however, will exist due to frictional forces between the engagement surface 74 and the receiving surface 50. Because the lateral forces are exerted directly on the guiding element 34, and not on the valve pin 30, stresses, such as bending stresses on the valve pin 30 are reduced. Furthermore, the guiding element 34 may, for example, have a larger bearing area, (which is sliding surface 46), as compared to the valve pin 30, and thus can be subject to reduced stresses from any lateral forces created between surfaces 74 and 50.

Reference is made to FIG. 3. The operation of the actuating mechanism to move the valve pin to the 'open' position is similar to the operation of the actuating mechanism 32 to move the valve pin 30 into the 'close' position. The actuator 38 extends, thereby rotating linkage element 36 about shaft 68 in the opposite direction to that for closing the gate 22. Engagement surfaces 76 engage receiving surfaces 52, to move the valve pin guiding element 34 and the valve pin 30 away from gate 22. The path of the arms 71 and the guiding element 34 to open gate 22, is similar, but opposite, to that of arm 70 and guiding element 34 to close gate 22.

Linkage element 36 has been described to include a single first arm, and two second arms, and guiding element 34 to include a single first receiving surface and two second receiving surfaces. Alternatively, however, the guiding element 34 may be configured in such a way that a single second arm may be used. For example, the guiding element may include a disc spaced above a valve pin holding portion, so that the linkage element engages the two surfaces of the disc. In this case, a single, centred second arm can be included on the linkage element, rather than two second arms.

In an embodiment where the engagement surfaces on the arms of the linkage element are arcuate, the receiving surfaces may have any suitable shape for receiving the engagement surfaces.

In an embodiment wherein the receiving surfaces on the guiding element are not substantially perpendicular to the line of travel LT, the engagement surfaces on the arms of the linkage element may have any suitable shape for engaging the receiving surfaces.

Figure 8:
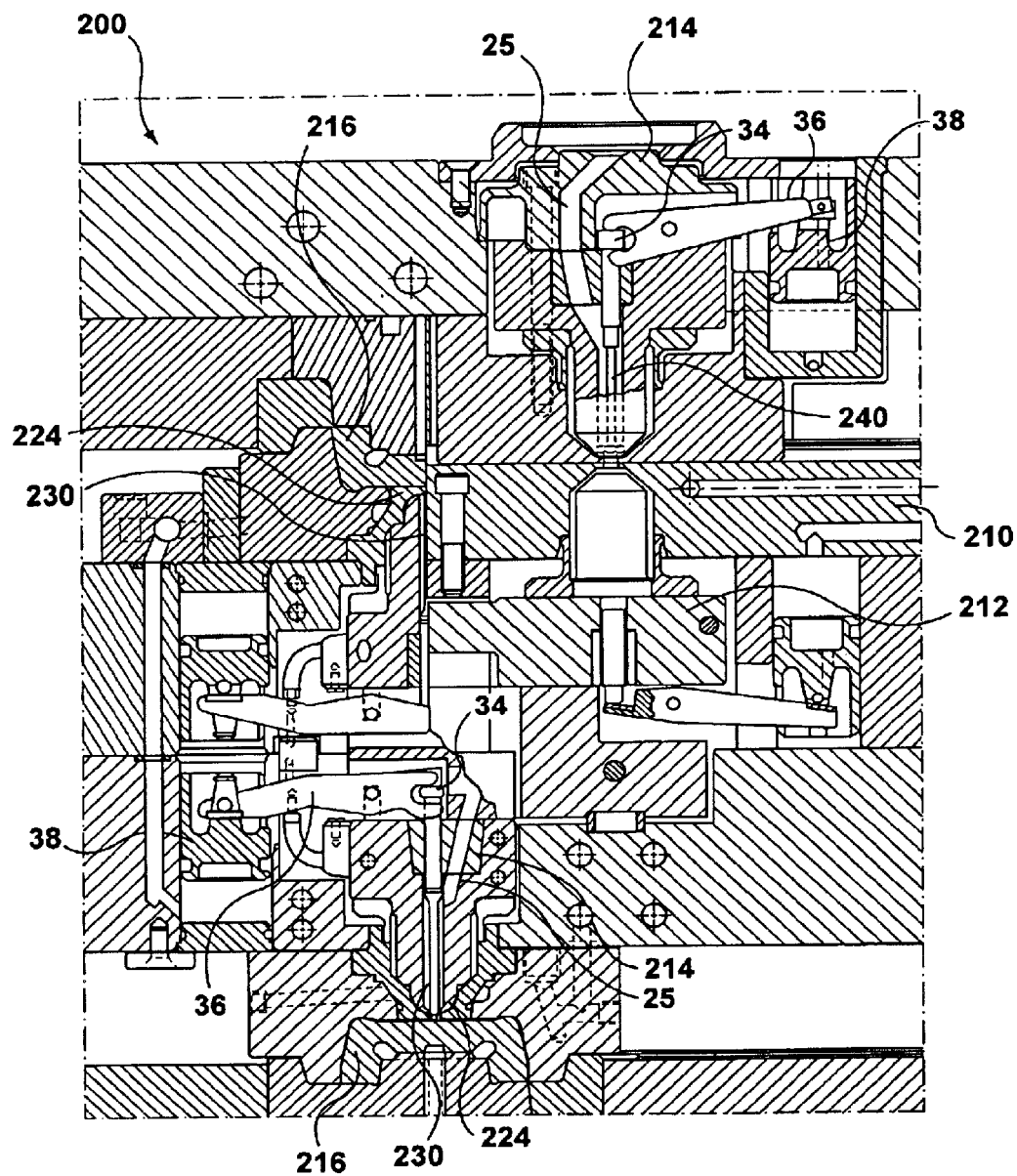
FIG. 8 is a sectional view of an injection molding machine having a stack mold, having valve pin actuating mechanisms as shown in FIG. 1.
Figure 9:
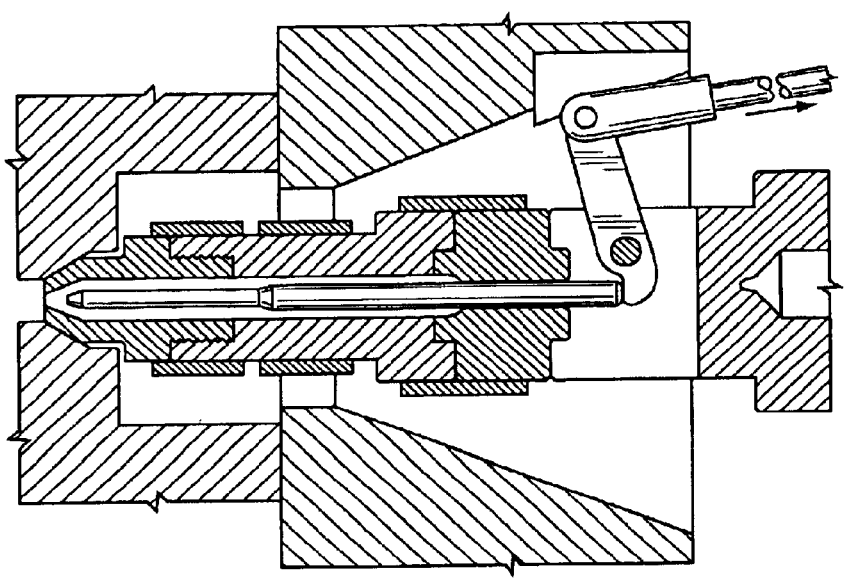
FIG. 9 is an elevation view of a portion of a first injection molding machine having a valve pin actuating mechanism of the prior art.
Figure 10:
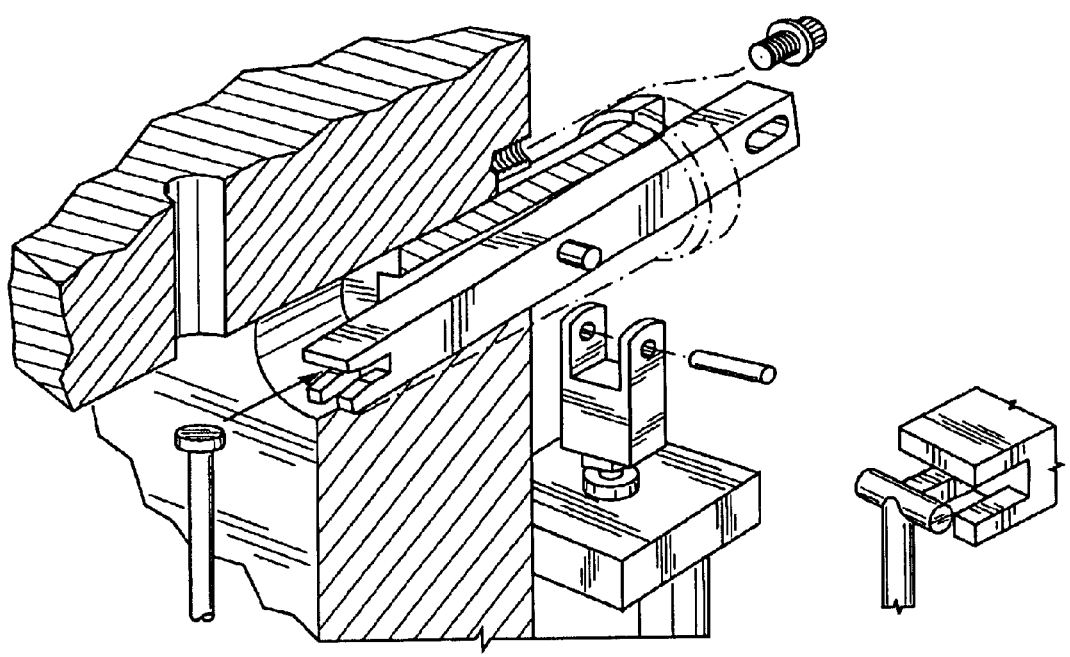
FIG. 10 is an elevation view of a portion of a second injection molding machine having a valve pin actuating mechanism of the prior art.

Reference is now made to FIG. 8, which shows an injection molding machine 200 having a stack mold, having a plurality of nozzle assemblies 33 and valve pin actuating mechanisms 32 in accordance with the present invention. Molding machine 200 is similar to the stack mold molding machine disclosed in U.S. Pat. No. 4,212,626, hereby incorporated by reference, except that the valve pin actuating mechanisms on the machine disclosed in that patent are replaced by valve pin actuating mechanisms 32. Molding machine 200 includes a plurality of manifold plates 212 which transfer melt from a melt source (not shown) to a plurality of mold cavity plates 216. Nozzle systems 33 including nozzles 214, valve pins 230 and valve pin actuating mechanisms 32 are used. Valve pin actuating mechanisms 32 are used to control valve pins 240 in melt transfer mechanisms to control melt flow between manifold plates 212. As well, actuating mechanisms are used to control valve pins 230 to control melt flow into mold cavities 224 in mold cavity plates 216.

While the above description constitutes the preferred embodiment, it will be appreciated that the present invention is susceptible to modification and change without departing from the fair meaning of the accompanying claims.

What is claimed is:

1. A valve pin actuating mechanism for use with a valve pin, the valve pin being moveable in a portion of a melt passage of an injection molding machine, the melt passage having an inlet for receiving melt from a melt source, the valve pin actuating mechanism comprising:
   a valve pin guiding element for connection to the valve pin and for guiding the valve pin along a line of travel, said valve pin guiding element having first and second receiving surfaces, wherein at least one of said receiving surfaces is substantially perpendicular to said line of travel;
   a linkage element, said linkage element having first and second arms having inwardly facing, opposed engagement surfaces for engaging said first and second receiving surfaces on said valve pin guiding element; and an actuator for moving said linkage element;
   wherein at least a portion of said valve pin is engaged directly by at least one of said first and second engagement surfaces.

2. A valve pin actuating mechanism for use with a valve pin, the valve pin being moveable in a portion of a melt passage of an injection molding machine, the valve pin actuating mechanism comprising:
   a valve pin guiding element for connection to the valve pin and for guiding movement of the valve pin in the melt passage, the valve pin guiding element having a first receiving surface with a valve pin bore and a second receiving surface longitudinally displaced from and substantially parallel to the first receiving surface;
   a linkage element including a first arm with a first engagement surface for engaging with the first receiving surface of the valve pin guiding element, and a second arm with a second engagement surface for engaging with the second receiving surface of the valve pin guiding element; and
   an actuator for moving the linkage element.

3. The valve pin actuating mechanism of claim 2, wherein the first receiving surface is substantially perpendicular to a line of travel of the valve pin.

4. The valve pin actuating mechanism of claim 2, wherein the linkage element includes two second arms having second engagement surfaces for engaging with the second receiving surface of the valve pin guiding element.

5. The valve pin actuating mechanism claim 2, wherein at least a portion of the valve pin is engaged directly by the first engagement surface of the linkage element.

6. A hot runner system for positioning between a mold gate of a mold cavity and a melt source of an injection molding machine, comprising:
   a manifold having a manifold melt passage for receiving melt from the melt source;
   a nozzle having a nozzle body defining a nozzle melt passage, the nozzle melt passage having an inlet for receiving the melt from the manifold melt passage;
   a heater connected to the nozzle body, the heater for heating melt in the nozzle melt passage;
   a valve pin having a head portion, wherein the valve pin is moveable in the nozzle melt passage; and
   a valve pin actuating mechanism including,
      a valve pin guiding element for holding and guiding the valve pin, the valve pin guiding element having a first receiving surface substantially perpendicular to a center line of the valve pin guiding element and a second receiving surface substantially parallel to the first receiving surface, wherein the head portion of the valve pin is disposed between the first and second receiving surfaces of the valve pin guiding element,
      a linkage element having a first arm for engaging the first receiving surface of the valve pin guiding element and a second arm for engaging the second receiving surface of the valve pin guiding element, and
      an actuator for moving the linkage element.

7. The hot runner system of claim 6, wherein the first receiving surface of the valve pin guiding element includes a receiving bore for receiving and capturing the valve pin.

8. The hot runner system of claim 7, wherein at least a portion of the valve pin is engaged directly by the first engagement surface of the linkage element.

9. The hot runner system of claim 6, wherein the linkage element includes two second arms having second engagement surfaces for engaging with the second receiving surface of the valve pin guiding element.

10. A hot runner system for positioning between a mold gate of a mold cavity and a melt source of an injection molding machine, comprising:
- a manifold having a manifold melt passage for receiving melt from the melt source;
- a nozzle having a nozzle body defining a nozzle melt passage, the nozzle melt passage having an inlet for receiving the melt from the manifold melt passage;
- a valve pin moveable in the nozzle melt passage and seatable in the mold gate; and
- a valve pin actuating mechanism including,
    - a valve pin guiding element for holding and guiding the valve pin, the valve pin guiding element having a first receiving surface substantially perpendicular to a centerline of the valve pin guiding element and a second receiving surface longitudinally displaced from the first receiving surface,
    - a linkage element having a first arm for engaging the first receiving surface of the valve pin guiding element at a point that is substantially along the centerline of the valve pin guiding element and a second arm for engaging the second receiving surface of the valve pin guiding element, and
    - an actuator for moving the linkage element.

11. The hot runner system of claim 10, wherein the first receiving surface of the valve pin guiding element includes a valve pin receiving bore that is coaxial with the centerline of the valve pin guiding element.

12. The hot runner system of claim 11, wherein at least a portion of the valve pin received within the bore is engaged directly by the first engagement surface of the linkage element.

13. The hot runner system of claim 10, wherein the linkage element includes two second arms having second engagement surfaces for engaging with the second receiving surface of the valve pin guiding element.

14. The hot runner system of claim 10, wherein the first receiving surface of the valve pin guiding element is substantially parallel to the second receiving surface of the valve pin guiding element.

* * * * *